Figure 1:
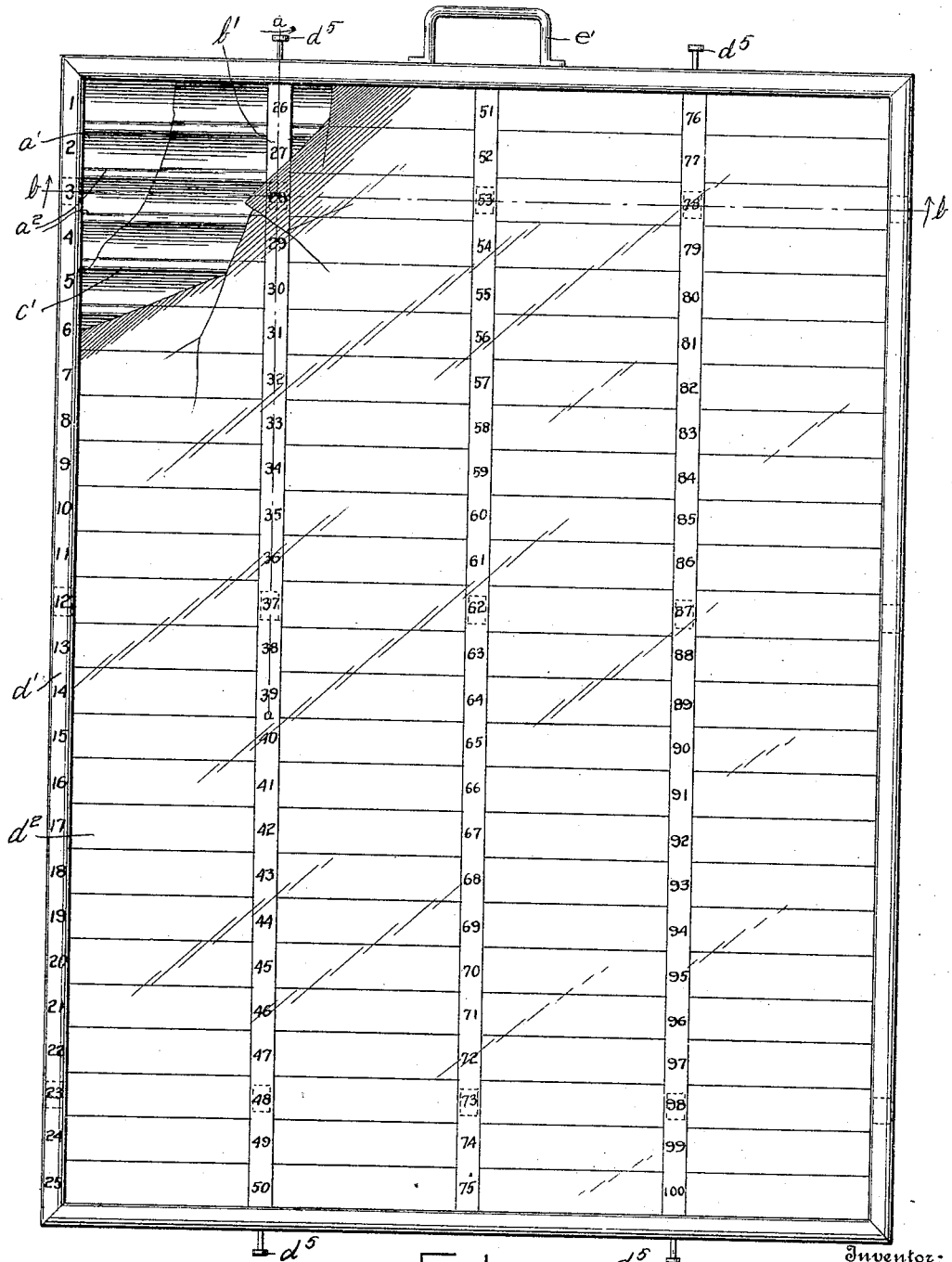

W. E. LACY.
SEED GERMINATING TESTER.
APPLICATION FILED APR. 28, 1908.

940,167.

Patented Nov. 16, 1909.
2 SHEETS—SHEET 1.

Witnesses
C. K. Reichenbach
Harold E. Stonebraker

Inventor:
William E. Lacy,
By Grenforth & Parry
his attorneys

W. E. LACY.
SEED GERMINATING TESTER.
APPLICATION FILED APR. 28, 1908.
940,167.
Patented Nov. 16, 1909.
2 SHEETS—SHEET 2.
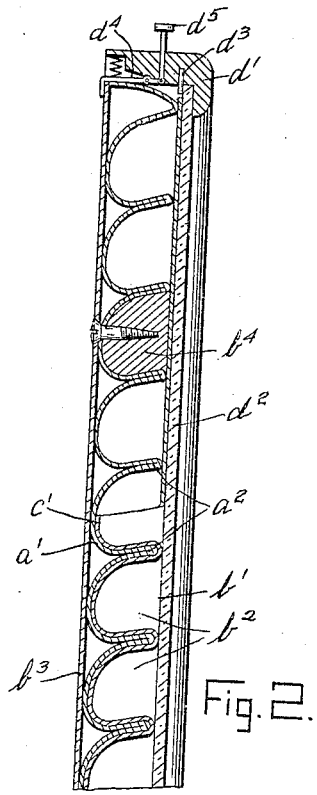
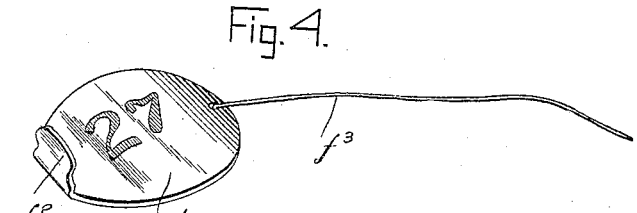
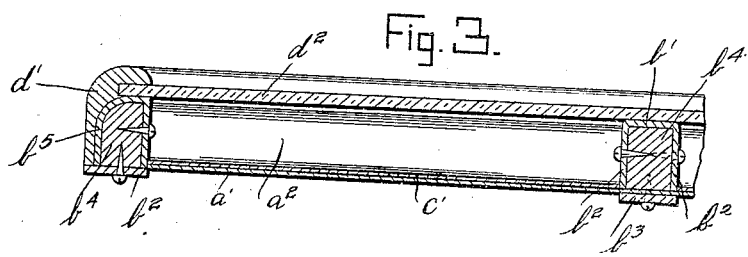
Witnesses
C. K. Reichenbach
Harold E. Stonebraker
Inventor
William E. Lacy,
By Dyrenforth & Parry
his Attorneys

UNITED STATES PATENT OFFICE.

WILLIAM E. LACY, OF AVON, NEW YORK.

SEED-GERMINATING TESTER.

940,167.    Specification of Letters Patent.    Patented Nov. 16, 1909.

Application filed April 28, 1908. Serial No. 429,752.

*To all whom it may concern:*

Be it known that I, WILLIAM E. LACY, a citizen of the United States, residing at Avon, in the county of Livingston and State of New York, have invented certain new and useful Improvements in Seed-Germinating Testers; and I do hereby declare the following to be a full, clear, and exact description of the invention, such as will enable others skilled in the art to which it appertains to make and use the same.

My invention relates to certain improvements in seed-germinating-testers, and more particularly, comprehends a device for determining accurately and efficiently the vitality and germinating power of seeds such as corn, oats, beans and other field seeds, vegetable seeds including radishes, lettuce, cabbage and the like, and flower seeds.

The purpose of my invention is to overcome the numerous objections which have been recognized in previous devices for this purpose. The essential elements necessary to an apparatus of this character are first, light; secondly, heat; and, third, moisture; and it is important that all of these components, but particularly the two last mentioned, namely, heat and moisture, be supplied to all parts of the apparatus constantly and to the proper degree, and that comparatively little of the heat and moisture be lost through radiation, evaporation, absorption or other means. In devices which are now employed embodying a wooden box, the seeds near the center of the box do not receive as much heat as those near the outer edge, and to obviate this is one of the purposes of my invention. Further, a wooden box absorbs a great amount of the moisture intended for the seed, in addition to the fact that the box is liable to swell and crack this being another great objection which is not present in my apparatus.

Briefly, my invention includes a receptacle constructed almost entirely of metal, and a bottom of a single piece of metal bent up and coöperating with longitudinal division strips to form the desired pockets for the seed. Moisture is supplied to the seed by lining the metal pockets with strips of paper or other absorbent material, which may be then saturated with water.

My invention consists further in a receptacle provided with a detachable, transparent top, and also means for suspending the receptacle by one end, so that the seed having been placed therein the top is put on to hold the seed in position, and the receptacle can then be hung to the ceiling or on the wall of a room where it is safe against disturbance of any kind, and where the progress made by the different seeds can be watched at all times. By suspending the device, I also obtain a more equal supply of heat to the seeds which are located at different parts of the holder.

Other objects and advantages will appear after considering my invention as disclosed in the detailed description hereinafter set forth, and defined in the appended claims.

In the drawings, which illustrate a preferred embodiment of my invention, Figure 1 is a front elevation of the entire device as positioned for operation. Fig. 2 is a longitudinal vertical section on line $a$—$a$ of Fig. 1. Fig. 3 is a transverse section on line $b$—$b$ of Fig. 1. Fig. 4 is a detail view of the tag employed, when corn or the like is being investigated, to identify the ear from which the seeds are taken.

Referring more particularly to the drawings, in which like reference characters refer to corresponding parts in the several views, $a^1$ designates a single sheet of metal, corrugated, or bent as shown in Fig. 2, to form the transverse division walls $a^2$. The sheet $a^1$ besides serving to form the transverse walls for the pockets, also serves as a bottom for the holder. The walls $a^2$ are inclined slightly, so that when the holder is suspended from its end, the seeds will not have a tendency to fall out, but will be retained by the upward slant of the walls, which act as bottoms for the pockets when the holder is suspended.

Arranged longitudinally of the holder, are series of division plates $b^1$ having downwardly extending flanges $b^2$ between each of the division walls $a^2$, thus dividing the transverse spaces between walls $a^2$ into four pockets as shown in Figs. 1 and 3. On the bottom of the holder are metal binding strips $b^3$ which are secured to blocks $b^4$, positioned at intervals longitudinally of the holder between the flanges $b^2$ on division plate $b^1$. The flanges $b^2$ and the strips $b^3$ are secured to the blocks $b^4$ by screws or other suitable retaining devices.

The outside division plates are rounded off to form a flange $b^5$, the purpose of having them curved being to obtain a tighter fit of the transparent cover against the pockets. Each of the pockets is suitably numbered, from one to one hundred, the numbers being preferably arranged on the division plates, but it is evident that the device may be made with as many more, or less pockets as desired.

A strip of absorbent paper, felt, or other suitable material $c^1$ is laid over the pockets, one strip being employed for each longitudinal series of pockets, and pressed in, to form a lining for the same. This may be moistened as often as desired, by sprinkling water thereon, and when it is ready to be discarded, may quickly be removed and another strip substituted.

The cover comprises a frame $d^1$ which is provided with a sheet of glass or other transparent material $d^2$ held in place by the pins $d^3$. $d^4$ designates a spring operated catch for locking the cover in position. I preferably employ four of these catches, each having a hand operated releasing knob $d^5$. A handle $e^1$ is attached to the frame of the cover, and is employed to suspend the device from the ceiling or wall of a room.

In Fig. 4, I show a tag $f^1$ which is used to identify the seed from which grains are taken to be tested. There are as many of these tags as there are pockets in the tester, and each one bears a number corresponding to one of the pockets. The tag $f^1$ carries a lug $f^2$ at one side and has a wire $f^3$ secured to the other side thereof, whereby it may be fastened to an ear of corn when grains are taken therefrom to be tested.

In operation, the linings of absorbent material are first placed in the pockets and properly moistened. If it is desired to test a quantity of corn, for instance, a few grains are taken from each ear and placed in one of the pockets. The tag bearing the same number as that particular pocket, is then secured to the ear from which the grains were taken, the ears all being kept in a crate or other suitable holder for that purpose.

The seeds having all been placed in the tester, the cover is then secured in position, and the device hung up in any convenient place where it will be near a source of heat, and free from disturbance of any kind. The progress and development of the seeds in each pocket may be watched from day to day, until it is time for them to be taken out. Ordinarily, when the absorbent strips are moistened once, it is sufficient to obtain successful results, although in some cases, a greater amount of moisture becomes necessary in which event, the cover may be removed, and more water sprinkled thereon.

Although I have disclosed my invention in a particular and preferred embodiment, the present construction is intended to include such changes and modifications as may be made without departing from the spirit of the same.

What I desire to secure by Letters Patent, and claim, is:—

1. A device of the character described including a body portion, laterally extending walls therein, division plates running longitudinally of the body portion, and flanges on the division plates projecting between said lateral walls and secured to said body portion.

2. A device of the character described including a body portion, laterally extending walls therein, division plates running longitudinally of the body portion, flanges on the division plates projecting between said lateral walls, blocks positioned between the flanges, and means for securing the blocks to said flanges and to the bottom of the body portion.

3. A device of the character described including a body portion, laterally extending walls therein, division plates running longitudinally of the body portion, flanges on the division plates, blocks positioned between said lateral walls and secured to the flanges, and strips on the bottom of said body portion secured to said blocks.

In testimony whereof, I affix my signature, in the presence of two subscribing witnesses.

WILLIAM E. LACY.

Witnesses:
CAROLINE B. LACY,
EDGAR G. SACKETT.